Feb. 23, 1960 G. A. LYON 2,926,044
WHEEL COVER
Filed April 13, 1956 3 Sheets-Sheet 1
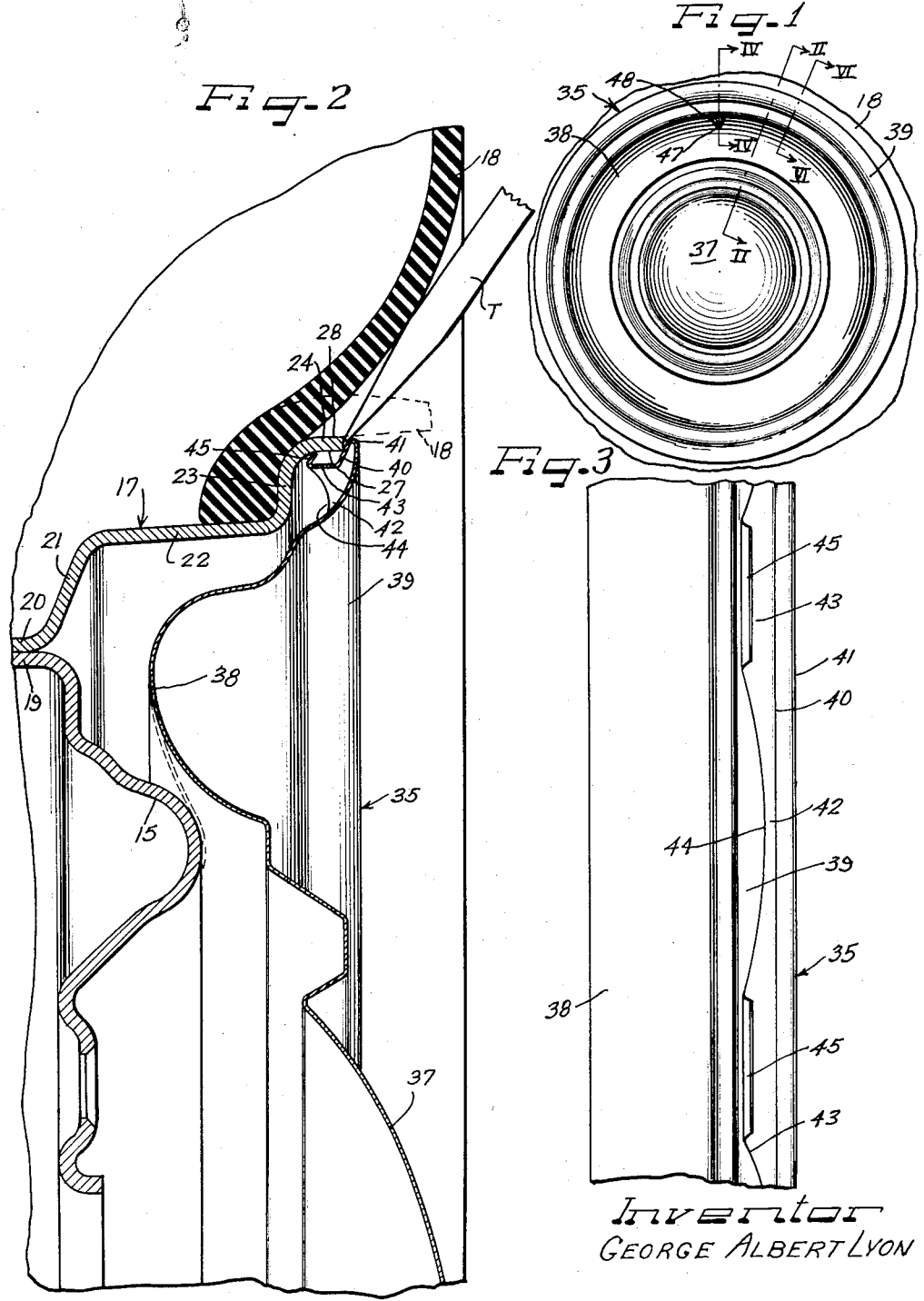
Inventor
GEORGE ALBERT LYON

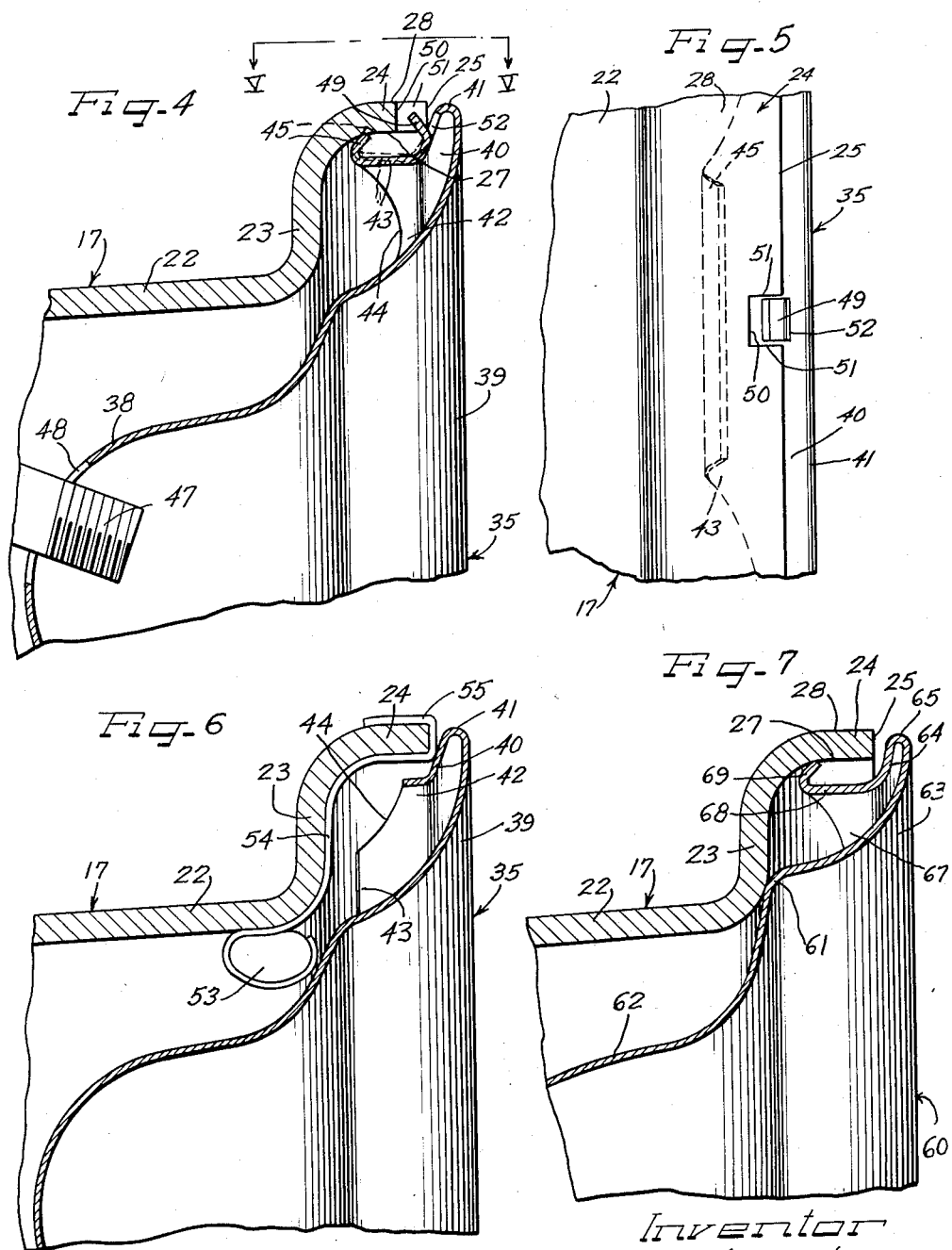

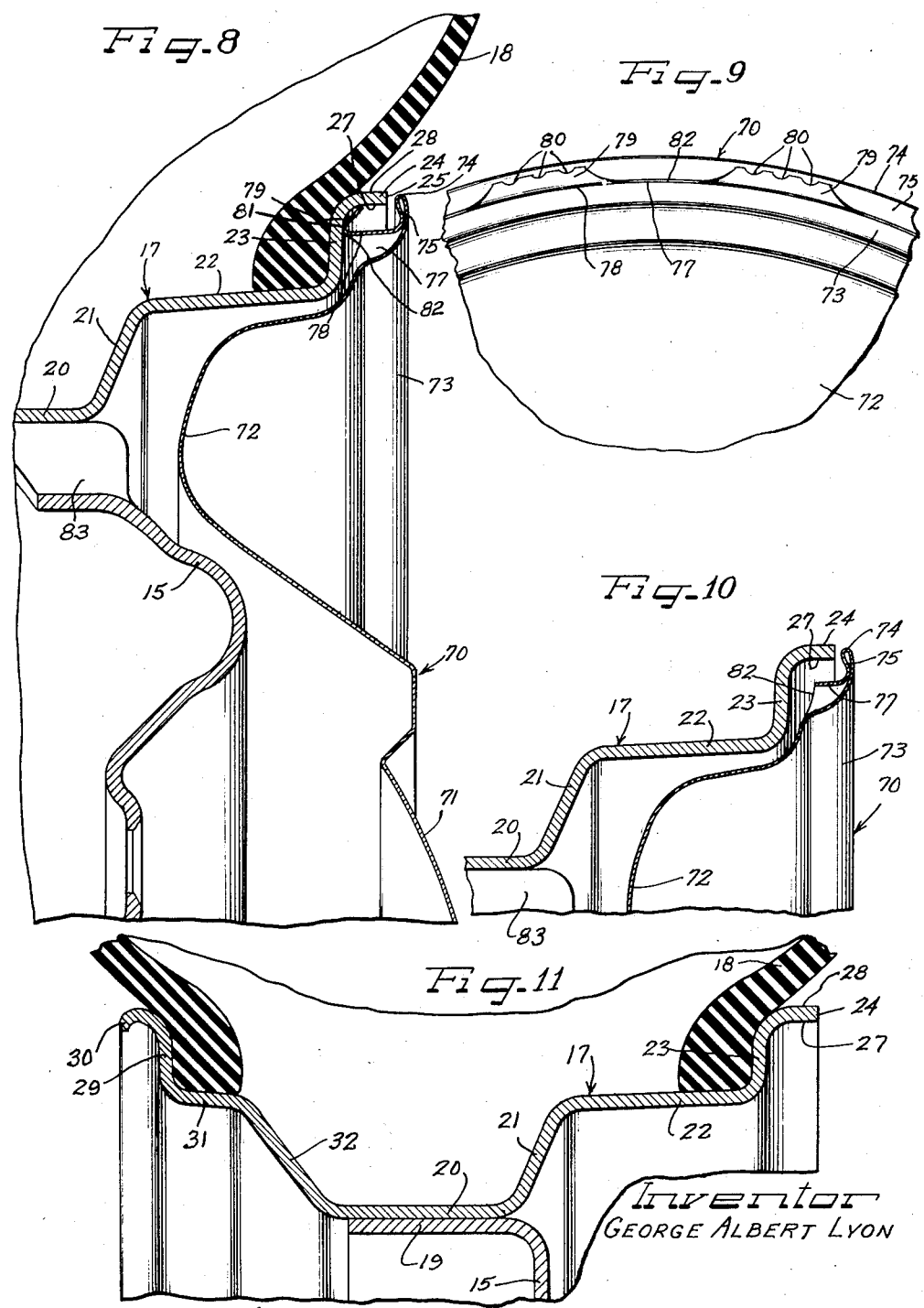

United States Patent Office 2,926,044
Patented Feb. 23, 1960

2,926,044
WHEEL COVER
George Albert Lyon, Detroit, Mich.
Application April 13, 1956, Serial No. 578,133
10 Claims. (Cl. 301—37)

The present invention relates to improvements in wheel structures and more particularly concerns the ornamental and protective covering of the outer sides of vehicle wheels.

The modern trend in automobile wheels is toward ever smaller wheels and larger tires. For example, although up to the present wheels of fifteenth inch diameter have been more or less standard, the trend is now toward wheels of fourteen inch diameter. Furthermore, tubeless tires have now become standard equipment for automobiles. The smaller wheels accommodate larger tires, thereby improving the ride characteristics of the vehicles.

In view of the smaller diameter of the wheels and the greater prominence of the outer side walls of the tires in relation thereto it is highly desirable to cover the wheel completely, inclusive of the terminal flange of the tire rim so as to afford a continuity of appearance harmoniously between the wheel cover and the tire, without any interruption or appreciable demarcation between the wheel cover and the tire. Such a demarcation line or area is presented where the terminal flange is exposed between the wheel cover and the tire side wall.

In the production of wheel covers, it is also highly desirable to provide as economical a construction as practicable which will permit of wide latitude in design preferences.

An important object of the present invention is to provide a wheel structure which embodies all of the desired features mentioned hereinabove in a practical, novel relationship between the wheel and the wheel cover.

Another object of the invention is to provide improved means for retaining a wheel cover on the outer side of a vehicle wheel.

A further object of the invention resides in the provision of an improved wheel cover retaining structure enabling making of wheel covers as one piece sheet metal units from sheet metal blanks utilizing the barest minimum of material.

Still another object of the invention is to provide a novel wheel cover and retaining structure therefore constructed and arranged for press-on, pry-off retention upon a novel generally cylindrical tire rim terminal flange extremity portion in a manner to completely overlap the terminal flange including its terminal or tip, while yet avoiding straining or dislodgment of the cover in the event of a soft or flat tire.

A still further object of the invention is to provide improved self-retaining means for wheel covers.

It is also an object of the present invention to provide in a vehicle wheel structure improved tire rim construction for accommodating tubeless tires.

Other objects, features and advantages of the present invention will be readily apparent from the following detailed description of certain preferred embodiments thereof taken in conjunction with the accompanying drawings in which:

Figure 1 is an outer side elevational view of a vehicle wheel structure embodying features of the invention;

Figure 2 is a fragmentary, enlarged radial sectional detail view taken substantially on the line II—II of Figure 1;

Figure 3 is a fragmentary edge elevational or plan view of the cover of Figures 1 and 2;

Figure 4 is a substantially enlarged fragmentary sectional detail view taken substantially on the line IV—IV of Figure 1;

Figure 5 is a fragmentary plan detail view taken substantially in the plane of line V—V of Figure 4;

Figure 6 is an enlarged fragmentary generally radial sectional detail view taken substantially on the line VI—VI of Figure 1 and showing the application of a wheel balancing weight to the wheel;

Figure 7 is a radial sectional detail view through the wheel substantially in the same plane as Figure 2 but showing a modified form of the cover;

Figure 8 is a fragmentary radial sectional detail view through a vehicle wheel showing a further modification;

Figure 9 is a fragmentary rear elevational view of a marginal portion of the cover of Figure 8;

Figure 10 is a fragmentary sectional detail view similar to Figure 8 but taken through a portion of the cover margin intermediate a pair of the cover retaining fingers; and Figure 11 is a fragmentary transverse sectional detail view through a typical tire rim according to the present invention especially suitable for supporting a tubeless tire.

Having reference first to Figures 1 and 2, a vehicle wheel is provided including a disk spider wheel body 15 supporting a multi-flange tire rim 17 which is especially adapted for carrying a tubeless pneumatic tire 18. About its radially outer perimeter the wheel body 15 has an axially inwardly extending attachment flange 19 which is secured to a radially facing and axially extending cylindrical base flange 20 of the tire rim. At the radially outer side of the tire rim it is provided with a rather narrow generally radially outwardly extending and axially outwardly sloping side flange 21 which merges with a generally axially outwardly extending intermediate flange 22 of substantially greater width, and preferably of a width that is substantially greater, and as shown, up to two or more times as wide as the usual retaining bead of the tire. At its axially outer extremity, the intermediate flange 22 merges with a terminal flange which has a generally radially outwardly extending annular inner portion 23 and a straight generally axially outwardly directed annular extremity portion 24 affording a tip extremity 25 and a radially inwardly facing annular generally axially straight face 27 and a corresponding annular opposite side generally straight radially outwardly facing surface 28. At least to the extent of this particular terminal flange construction, the present application is a continuation-in-part of my copending application Serial No. 245,938, filed September 10, 1951, now Patent No. 2,748,457 issued June 5, 1956. While the extremity flange portion 24 may be perfectly cylindrical it may vary a few degrees either way, about 3° tilt either radially inwardly or outwardly having been found acceptable. Therefore, some such slight variation is comprehended by "generally" or "substantially" cylindrical.

A great advantage of having the outer side intermediate flange 22 of the tire rim 17 of substantially greater width than the tire bead resides in that should the tire go soft or flat so that there is a tendency of the supported tire bead to shift axially inwardly along the intermediate flange 22 it may do so to a substantial extent without danger of collapsing into the drop center central channel of the tire rim. Hence, there is less likelihood of the tire coming off of the wheel than where the bead at the outer side of the tire could collapse readily into the drop center. Moreover, since the outer side bead of the tire is held against dropping into the center channel of the tire rim, the tire is supported against canting, and thereby the bead at the inner side of the tire is held in place. This is an important feature especially on the front wheels of an automobile since, especially at high speeds, the driver is better enabled to maintain control of the vehicle in the event of a flat tire.

Further assistance in maintaining the tire against canting, and also to protect the soft or flat tire against undue damage, derives from the support afforded for the tire side wall by the generally cylindrical radially outer face 28 of the tire rim terminal flange. It will be appreciated that the combination of the wide intermediate flange 22 with the flat generous width terminal flange face 28 affords good support for the outer side of the tire in the event of a soft or flat condition as depicted in dash outline in Fig. 2. Thereby damage to the tire side wall is minimized.

At the radially inner side of the tire rim (Fig. 11) the flange structure is such as to facilitate mounting the tire 18. It is known, of course, that tubeless tires have beads of substantial strength and stiffness. Therefore sharp or cutting or abrading edges on the terminal flange tip are detrimental as liable to damage the tire beads thus not only weakening the bead but, possibly more importantly, interfering with or destroying the air seal contact of the bead with the tire rim. Herein, working of the tire beads onto the rim in mounting the tire is substantially facilitated by providing an axially inner side terminal flange 29 with a substantially turned, generally axially and radially inwardly directed extremity lip 30 which is rounded in cross-section so as to avoid any sharp edges which might tend to damage the tire beads as they are worked over the terminal flange 29 in mounting the tire.

Merging with the inner side terminal flange 29 is a narrow annular intermediate flange 31 which is preferably just wide enough to provide an adequate seat for the inner bead of the tire 18. Sloping radially inwardly and axially outwardly from the narrow inner intermediate flange 31 of the tire rim is an inner side flange that merges with the base flange 20 and is preferably somewhat wider than the outer side flange 21 of the tire rim and of a more acutely oblique angle to the base flange than the outer side flange 21. Through this arrangement, dropping of the outer side bead of the tire into the drop center channel of the tire rim is facilitated from the inner side of the tire rim as the tire is being mounted.

It will thus be apparent that the tire rim 17 is especially desirable for accommodating the tubeless tire 18. Not only does the rim have the desirable drop center feature which facilitates application and removal of the tire, but the outer side of the rim provides not only desirable support for the outer side of the tire but affords a safety feature which is especially desirable in view of the current trend to smaller wheels, of which the fourteen inch wheel is typical, and larger tires, but also protects the tire side wall against damage when the tire goes soft or flat. At the same time, the construction at the inner side of the tire rim 17 facilitates application or removal of the tire without danger of damaging the tire beads, and thus compensates for the safety and protective features of the outer side of the tire rim which hamper, if they do not preclude application or removal of the tire with respect to the outer side of the wheel.

Another important advantage of providing the outer side straight terminal flange portion 24 of load bearing form and width resides in that it enables convenient and efficient retaining engagement therewith of retaining means on a wheel cover 35 for ornamental and protective disposition at the outer side of the wheel and more particularly in full covering relation to the tire rim 17 and at least a substantial portion of the adjacent area of the wheel body 15. As shown, the wheel cover 35 may be either in the form of a full one piece disk or plate which will completely overlie the wheel body and the tire rim, or it may be in the form of a trim ring as shown in dash outline to cooperate with a conventional hub cap that may be held on the wheel in any preferred manner as by means of retaining clips (not shown).

Where, as shown in full outline in Figs. 1 and 2, the wheel cover 35 comprises a full disk, it may be provided with a central crown portion 37 which leads into an intermediate axially inwardly dished annular portion 38 at the radially outer side of which is a generally radially and axially outwardly directed annular marginal tire rim overlying or covering portion 39. The central crown portion 37 provides a substantial chamber therebehind for receiving the axle hub portion of an axle structure (not shown) to which the central bolt-on flange of the wheel body 15 is adapted to be attached in service. The intermediate inwardly dished portion 38 of the cover is adapted to extend in toward the side flange 21 of the tire rim and the adjacent portion of the wheel body. The radially outer portion 39 of the cover is preferably of generally annularly ribbed reinforced form and is of an outside or peripheral diameter about the same as the diameter of the terminal flange radially outer load bearing face 28 of the terminal flange but preferably to lie just inside of or flush with the diameter of the surface 28. This is important for enabling covering completely of the tire rim inclusive of the tip 25 of the terminal flange while yet remaining safely beyond any damaging or detrimental contact with the side wall of the tire 18 should the latter go flat or soft and thus be forced by the load of the vehicle to bear or thrust against the load bearing tire rim terminal flange surface 28 substantially as indicated in dot dash outline in Fig. 2. In other words in the event of a soft or flat tire there is thus no danger of warping or bending or otherwise damaging of the cover periphery by pressure from the tire side wall, nor is there any danger that the cover may be forced from the wheel by pressure from the tire side wall, but nevertheless the tire rim inclusive of the terminal flange 24 is completely covered by the cover margin 39 and there is no unsightly or at least unesthetic demarcation between the edge of the cover and the tire side wall.

The cover 35 is adapted to be produced economically from suitable thin gauge sheet material which is susceptible of taking a desirable finish such as a highly polished and plated finish. Exemplary of such material is stainless steel or brass. Such material may be pressed or drawn to shape by mass production die press operations.

By the present invention, moreover, substantial economy of material is effected even though the diameter of the cover is such as to substantially completely cover the wheel, by providing behind the peripheral extremity of the cover retaining flange finger structure engageable in press-on, pry-off relation with the terminal flange portion 24 and more particularly with the inner axially generally flat, cylindrical surface 27 thereof. To this end, the outer marginal extremity portion of the cover margin 39 is uniformly turned under to provide an annular preferably generally radially and axially inwardly obliquely sloping flange 40 affording a turned, rounded reinforcing and finishing bead-like extremity edge 41 for the cover.

From the turned extremity 41, the underturned flange 40 extends inwardly in preferably generally spaced, divergent relation to the overlying cover marginal portion 39 and to an inner diameter somewhat smaller than the diameter of the terminal flange surface 27 to merge with an axially inwardly extending annular continuous narrow flange extension 42 from which extends a plurality of retaining finger extensions 43. Each of the retaining fingers 43, of which there may be 12 to 16, or more if preferred, is of substantial width, arcuate in the curvature of the circumference defined by the flange 42, and divided by intermediate preferably arcuate cutouts 44 so that the sides of the fingers substantially merge with one another at the terminus of the inturned axially extending flange extension 42 from which the fingers 43 are extensions.

Each of the retaining fingers 43 has extending from the axially inner terminus of the body portion thereof a short and stiff generally radially and axially outwardly extending oblique retaining terminal 45 the edge of which is retainingly grippingly engageable with the tire rim terminal flange surface 27. It will thus be observed that the difference in outside diameter of the axially extending continuous flange portion 42 and the finger extensions 43 is such as to accommodate the outturned retaining terminals 45 in the gap or space thus provided between the fingers and the terminal flange surface 27. Normally, however, the finger terminals 45 extend to a slightly larger diameter than the terminal flange surface 27 as shown in dash outline in Fig. 4. Then, when the cover is applied to the outer side of the wheel the retaining finger terminals 45 will tend first to engage against the inner edge defining the terminal flange tip 25. Then, as axially inward pressure is applied to the cover, the terminals 45 cam radially inwardly and effect radially inward resilient deflection of the retaining fingers 43. Since the retaining fingers 43 are rather short and several times wider than long and merge at their sides to the short flange extension 42, the latter is also flexed, as is also the at least adjacent portion of the under turned flange 40. Thereby, substantial resiliently tensioned thrust is developed in the retaining fingers 43 and more particularly in the tips of the short and stiff retaining terminals 45 so that the terminals effectively grip firmly against the terminal flange surface 27. It will be observed that since the inturned flange portion 42 is continuous, all of the retaining fingers 43 are connected into a mutually cooperative flexible ring relationship whereby they coact to assure thorough grip by each of the fingers against the terminal flange surface 27 without danger of any finger being overstressed. Yet each individual finger is self-adjustable to that portion of the terminal flange surface 27 against which it engages.

Inasmuch as the radius between the terminal flange portions 23 and 24 may be greater, as shown in Figs. 2 and 4, than the spacing between the retaining fingers 43 and the substantially parallel terminal flange surface 27 in the assembled relationship of the cover with the wheel, it is desirable under such circumstance to predetermine the axially inward disposition of the cover and more particularly the marginal portion thereof to limit the axially inward assembled disposition of the inner ends of the retaining fingers short of the radius. In one desirable mode of accomplishing this, the underturned flange 40 by engaging against the terminal flange tip 25 serves as a cover positioning stop. In this arrangement, of course, the combined length of the fingers 43 and the width of the flange portion 42 is less than the width of the terminal flange portion 24. Thereby, when the underturned flange 40 bottoms against the terminal flange tip 25 the inner ends of the retaining fingers 43 will remain spaced from the reentrant radius or fillet at juncture of the terminal flange portions 23 and 24. Moreover, the retaining fingers 43 by their uniform mutually cooperative tensioned retaining grip against the terminal flange surface 27 maintain the cover in centered relation on the wheel.

Removal of the cover 35 from the wheel may be effected by means of a pry-off tool such as a screwdriver T (Fig. 2). Since the edge 41 of the cover does not to any appreciable extent, at least, overhang the terminal flange portion 24 radially outwardly thereof for leverage engagement by the pry-off tool T, the construction and arrangement are such that a pry-off tool gap is afforded between the radially outer portion of the underturned flange 40 and the terminal flange tip 25. This is effected by the radially and axially inwardly oblique disposition of the flange 40 so that engagement thereof with the terminal flange tip is adjacent the inner edge of the tip while the radially outer portion of the flange 40 is in diverging spaced relation to the terminal flange tip. Through this arrangement the tip of the pry-off tool T can be forced into the pry-off gap between the cover edge and more particularly behind the flange 40 and by a twisting motion exert pry-off force to the margin of the cover to draw the adjacent retaining finger or fingers and more particularly the terminals 45 thereof axially outwardly along the terminal flange face 27. Additional pry-off leverage may be afforded by the axially outwardly bulging side wall of the tire 18 against which the pry-off tool T may be intermediately rocked as a pry-off fulcrum.

For access to a valve stem 47, the dished intermediate cover portion 38 is provided with a valve stem aperture 48. In service it is necessary that the valve stem aperture 48 remain substantially registered with the valve stem 47 so as to prevent distortion and possibly damage to the valve stem. It is therefore desirable to provide means to prevent the cover 35 from turning on the wheel. Conveniently, such means may comprise turn-preventing shoulder structure on the cover interengageable with complementary turn-preventing shoulder structure on the tire rim. Herein the respective shoulder structures comprise a turn-preventing tang 49 struck from and bent generally axially inwardly and projecting generally radially outwardly from the underturned cover marginal flange 40. The shoulder structure on the tire rim is afforded by a notch 50 in the terminal flange portion 24 and opening outwardly through the tip 25. Side shoulders 51 defining the notch 50 oppose the side edges of the anti-turn tang 49 providing complementary shoulders. By preference the tang 49 is provided in radial general alignment with the valve stem aperture 48, and the anti-turn notch 50 is provided in radial alignment with the valve stem 47. Therefore in applying the cover to the outer side of the wheel registration of the valve stem aperture 48 and registration of the anti-turn tang 49 within the notch 50 can be effected in the same initial movement on application or mounting of the cover on the wheel.

It may also be noted that an aperture 52 in the underturned flange 40 resulting from striking out of the tang 49 is freely open from the inwardly opening channel defined between the underturned flange 40 and the marginal cover portion 39. Since such aperture 52 is closely adjacent to the extremity or edge 41 of the cover, it serves as a vent for discharge of dirt or water that may get in behind the cover. During running of the wheel, centrifugal force will carry material out through the discharge opening 52. Likewise, dirt or water that may be centrifugally carried against the tire rim terminal flange portion 24 can escape through the anti-turn notch 50.

As shown in Fig. 6, where a wheel balancing weight 53 must be applied to the wheel, it may be provided with a retainer arm 54 generally conformed to the terminal flange portions 24 and 23 and of a length to support the weight against the axially outer portion of the intermediate flange 22 clear of the marginal portion 39 of the cover and spaced inwardly out of any possibility of interfering with proper action of the retaining fingers 43. A generally U-shaped clamp portion 55 of the wheel weight arm engages over the terminal flange portion 24.

In a modification of the cover as shown in Fig. 7, a cover member 60 which may in general respects be similar to the cover 35 and applicable to a wheel that embodies the general features of the wheel in Fig. 2 is shown as provided with an indented annular marginal rib 61 between an intermediate cover portion 62 and an outer extremity marginal portion 63, for bottoming against the radially inner portion of the terminal flange 23 for thereby determining the axially inward limit or disposition of the cover on the wheel. In this form of the invention, an underturned generally radially inwardly and axially inwardly directed flange 64 joins the extremity of the marginal cover portion 63 on a reinforcing and finishing bead-like juncture 65 and is held in gap or spaced relation to the tip 25 of the terminal flange by the bottoming of the radially and axially inwardly disposed bottoming shoulder rib 61 against the terminal flange portion 23. Extending axially inwardly from the inner side of the underturned flange 64 is a flange extension 67 which retaining finger extensions 68 project generally axially inwardly and have short and stiff retaining terminals 69 extending generally radially and axially outwardly obliquely for gripping retaining edgewise engagement with the terminal flange surface 27 in substantially the same manner as the retaining fingers 43 and retaining terminals 45 in Fig. 2. The length of the fingers 68 is such that in the fully assembled relation with the wheel the innermost end portions of the fingers remain clear of the reentrant radius or fillet at juncture of the terminal flange portions 23 and 24 of the tire rim. It will be observed that a substantial pry-off tool gap is afforded between the underturned flange 64 and the terminal flange tip 25.

In the modification of Figs. 8, 9 and 10, a cover 70 comprising in general detail a similar structure as in the cover 35 is adapted to be applied to the outer side of a similar wheel as in Fig. 2 and similar reference numerals indicate like parts. The cover 70 includes as shown, in the full disk form thereof a central crown portion 71, an intermediate annular dished portion 72 and a radially outer marginal portion 73 having a terminal extremity or tip 74 of turned finishing bead-like reenforcing form extending substantially into the plane of the outer bearing surface 28 of the terminal flange portion 24. An underturned generally radially inwardly extending flange 75 behind the cover marginal portion 73 has a generally axially inwardly extending annular portion 77 from which extend generally axially inwardly a series of cover retaining fingers 78 integral in one piece therewith and provided with generally radially and axially outwardly oblique substantially stiff retaining terminals 79 engageable edgewise against the inner surface 27 of the terminal flange portion 24. Each of the terminals 79 may be provided with a plurality of shallow notches 80 in the gripping edge thereof so as to afford a plurality of sharp corners engageable with the rim surface 27 to resist turning of the cover on the wheel.

Axially inward disposition of the cover 70 on the wheel is effected by having shoulders 81 at the junctures of the retaining fingers 78 with the terminals 79 thereof arranged to bottom against the radially extending terminal flange portion 23. To effect this and clear the reentrant radius at juncture of the terminal flange portions 23 and 24, the flange 75 is of sufficient width to extend radially inwardly beyond the terminal flange radius. In other words, the spacing thus afforded for the axially extending flange portion 77 and the retaining fingers 78 radially inwardly from the terminal flange surface 27 is somewhat greater and as shown about twice the spacing or distance as compared to the spacing between the retaining flange portion 42 and the retaining fingers 43 in Fig. 2. Moreover, in order to afford a substantial gap between the terminal flange tip 25 and the underturned cover flange 75 whereby to accommodate a pry-off tool, the flange 77 is of somewhat greater length than the flange 42 in Fig. 2. In the manner of operation, however, the retaining fingers 78 and the continuous annular axially extending flange 77 and the retaining terminals 79 are substantially the same as described for the corresponding flange and finger structure of the cover 35.

In addition, the cooperation of the cover 70 with the wheel enables at least some air circulation and also discharge of dirt or water from behind the cover through the gap between the flange 75 and the terminal flange. It will be noted that between the fingers 78 arcuate cut-outs 82 afford a series of passages that communicate with the extremity gap between the tire rim and the cover and the space behind the cover leading from wheel openings 83 provided in the attachment flange 19 of the wheel body in the usual manner and serving as air circulation openings.

From the foregoing it will be observed that in all forms of the invention the marginal extremity of the cover in effect laps about in concealing relation to the axially outwardly extending straight terminal flange extremity portion. The retaining fingers are shorter than the axially extending terminal flange portion and are effectively connected operatively together through the axially extending continuous annular flange from which the fingers are inward extensions. The relationship of the retaining fingers to the overhanging radially outwardly projecting tire rim terminal flange concealing edge portion of the cover is in substantially lop-sided U arrangement with the cover terminus providing the longer leg of the U. In each of the covers a bottoming structure spaced both radially and axially from the retaining finger terminals maintains the cover in predetermined axial disposition relative to the wheel.

There is little if any danger of curbing damage to the terminal peripheral portion of the cover that overlaps and conceals the lip of the terminal flange since the tire side wall at the outer side of the tire in a tire of the size to be mounted on a fourteen inch wheel, for example, projects so far outwardly that it serves as a buffer and spacer preventing engagement of curbing or the like against the cover periphery.

Inasmuch as the retaining flange structure of the covers comprises only relatively narrow marginal portions of a sheet metal blank from which the covers are made, substantial economy in material is attained.

It will be understood that modifications and variations may be effected without departing from the scope of the novel concepts of the present invention.

I claim as my invention:

1. In a wheel structure including a wheel body and a tire rim supported thereby including an outer side terminal flange with a substantially straight extremity flange portion providing substantially cylindrical radially inner and outer surfaces, a cover for disposition at the outer side of the wheel including a marginal extremity for overlying the terminal flange inclusive of said extremity flange portion but with the cover edge lying within the plane of the radially outer terminal flange extremity portion surface, and cover retaining means behind the cover extremity including a flange extending generally radially inwardly from the cover edge and then extending generally axially inwardly into spaced substantially parallel relation to the axially outer portion of the radially inner surface of the terminal flange extremity portion, there being a circumferentially spaced series of generally axially inwardly extending retaining finger extensions from said axially extending flange portion provided with generally radially and axially outwardly oblique short and stiff retaining terminal fingers having edges directly retainingly grippingly engageable with said radially inwardly facing terminal flange extremity portion surface.

2. In a wheel structure including a wheel body and a tire rim supported thereby including an outer side terminal flange with a substantially straight extremity flange portion providing substantially cylindrical radially inner and outer surfaces, a cover for disposition at the outer side of the wheel including a marginal extremity for overlying the terminal flange inclusive of said extremity flange portion but with the cover edge lying within the plane of the radially outer terminal flange extremity portion surface, and cover retaining means behind the cover extremity including a flange extending generally radially inwardly from the cover edge and then extending generally axially inwardly into spaced substantially parallel relation to the axially outer portion of the radially inner surface of the terminal flange extremity portion, there being a circumferentially spaced series of generally axially inwardly extending retaining finger extensions from said axially extending flange portion provided with generally radially and axially outwardly oblique short and stiff retaining terminal fingers having edges directly retainingly grippingly engageable with said radially inwardly facing terminal flange extremity portion surface, said radially inwardly extending retaining means flange bearing against the tip of the terminal flange extremity portion and thereby determining the axially inward disposition of the cover on the wheel.

3. In a wheel structure including a wheel body and a tire rim supported thereby including an outer side terminal flange with a substantially straight extremity flange portion providing substantially cylindrical radially inner and outer surfaces, a cover for disposition at the outer side of the wheel including a marginal extremity for overlying the terminal flange inclusive of said extremity flange portion but with the cover edge lying within the plane of the radially outer terminal flange extremity portion surface, and cover retaining means behind the cover extremity including a flange extending generally radially inwardly from the cover edge and then extending generally axially inwardly into spaced substantially parallel relation to the axially outer portion of the radially inner surface of the terminal flange extremity portion, there being a circumferentially spaced series of generally axially inwardly extending retaining finger extensions from said axially extending flange portion provided with generally radially and axially outwardly oblique short and stiff retaining terminal fingers having edges directly retainingly grippingly engageable with said radially inwardly facing terminal flange extremity portion surface, the cover having a radially inner portion thereof for bottoming against the radially extending terminal flange portion for thereby determining the axially inward disposition of the cover.

4. In a wheel structure including a wheel body and a tire rim supported thereby including an outer side terminal flange with a substantially straight extremity flange portion providing substantially cylindrical radially inner and outer surfaces, a cover for disposition at the outer side of the wheel including a marginal extremity for overlying the terminal flange inclusive of said extremity flange portion but with the cover edge lying within the plane of the radially outer terminal flange extremity portion surface, and cover retaining means behind the cover extremity including a flange extending generally radially inwardly from the cover edge and then extending generally axially inwardly into spaced substantially parallel relation to the axially outer portion of the radially inner surface of the terminal flange extremity portion, there being a circumferentially spaced series of generally axially inwardly extending retaining finger extensions from said axially extending flange portion provided with generally radially and axially outwardly oblique short and stiff retaining terminal fingers having edges directly retainingly grippingly engageable with said radially inwardly facing terminal flange extremity portion surface, said retaining fingers having at juncture of the retaining terminals thereof with the body portions of the fngers shoulders engageable in bottoming relation against the radially extending terminal flange portion for thereby determining the axially inward disposition of the cover.

5. In a wheel structure including a wheel body and a tire rim supported thereby including an outer side terminal flange with a substantially straight extremity flange portion providing substantially cylindrical radially inner and outer surfaces, a cover for disposition at the outer side of the wheel including a marginal extremity for overlying the terminal flange inclusive of said extremity flange portion but with the cover edge lying within the plane of the radially outer terminal flange extremity portion surface, and cover retaining means behind the cover extremity including a flange extending generally radially inwardly from the cover edge and then extending generally axially inwardly into spaced substantially parallel relation to the axially outer portion of the radially inner surface of the terminal flange extremity portion, there being a circumferentially spaced series of generally axially inwardly extending retaining finger extensions from said axially extending flange portion provided with generally radially and axially outwardly oblique short and stiff retaining terminal fingers having edges directly retainingly grippingly engageable with said radially inwardly facing terminal flange extremity portion surface, there being means on the cover bottoming against the terminal flange for maintaining a pry-off tool gap relationship between the terminal flange tip and the edge of the cover.

6. In a wheel structure including a tire rim having a terminal flange with a terminal portion projecting freely beyond where the tire normally engages the terminal flange, a cover for disposition at the outer side of the wheel, the cover including retaining means engageable with the wheel and having a valve stem aperture registerable with a valve stem projecting from the tire rim, and means for retaining the cover against turning including generally circumferentially facing complementary shoulders on the terminal flange portion and the cover freely opposingly related to hold the cover against turning on the wheel.

7. In a wheel structure including a tire rim having a terminal flange with a terminal portion projecting freely beyond where the tire normally engages the terminal flange, a cover for disposition at the outer side of the wheel, the cover including retaining means engageable with the wheel and having a valve stem aperture registerable with a valve stem projecting from the tire rim, and means for retaining the cover against turning including generally circumferentially facing complementary shoulders on the terminal flange portion and the cover freely opposingly related to hold the cover against turning on the wheel, said turn-preventing shoulders comprising, respectively, the sides of a notch in the terminal flange portion opening through the tip thereof and shoulders afforded by a pressed out element on the margin of the cover engageable in said notch by axial movement of the cover.

8. In a wheel structure including a tire rim having a terminal flange with a terminal portion projecting freely beyond where a tire normally engages the terminal flange, a cover for disposition over the outer side of the wheel including an outer marginal portion for overlying the terminal flange and having an underturned flange, the terminal flange having a notch therein opening axially outwardly from the tip of said terminal flange portion, and said underturned cover flange having a tang struck therefrom and engageable in said notch by axial movement of the cover for holding the cover against turning.

9. A wheel structure as defined in claim 1 wherein the extremity flange portion of the terminal flange has circumferentially facing shoulder means and the cover retaining means has complementary shoulder means interengageable with the rim flange shoulder means for holding the cover against turning on the wheel, so that a valve stem projecting through a portion of the cover will be protected against distortion.

10. A wheel structure as defined in claim 1 wherein the tip of the terminal flange extremity portion has a generally axially outwardly opening notch therein, and the radially inwardly extending flange of the cover has struck therefrom short and stiff projecting means engageable in said notch to hold the cover against turning relative to the wheel.

References Cited in the file of this patent

UNITED STATES PATENTS

| 2,085,647 | Freeman | June 29, 1937 |
| 2,123,025 | Ramirez | July 5, 1938 |
| 2,148,995 | Nelson | Feb. 28, 1939 |
| 2,394,958 | Wood | Feb. 12, 1946 |
| 2,607,632 | Lyon | Aug. 19, 1952 |
| 2,683,628 | Lyon | July 13, 1954 |
| 2,690,358 | Lyon | Sept. 28, 1954 |
| 2,804,346 | Landell | Aug. 27, 1957 |

FOREIGN PATENTS

| 916,386 | Germany | Aug. 9, 1954 |
| 744,837 | Great Britain | Feb. 15, 1956 |